United States Patent
Tsai

(10) Patent No.: US 12,461,694 B2
(45) Date of Patent: Nov. 4, 2025

(54) METHOD AND NON-TRANSITORY COMPUTER-READABLE STORAGE MEDIUM AND APPARATUS FOR CONFIGURING CURRENT BLOCK TO PROGRAM DATA

(71) Applicant: Silicon Motion, Inc., Zhubei (TW)

(72) Inventor: Cheng-Yu Tsai, Kaohsiung (TW)

(73) Assignee: SILICON MOTION, INC., Zhubei (TW)

( * ) Notice: Subject to any disclaimer, the term of this patent is extended or adjusted under 35 U.S.C. 154(b) by 0 days.

(21) Appl. No.: 18/639,142

(22) Filed: Apr. 18, 2024

(65) Prior Publication Data
US 2025/0190143 A1 Jun. 12, 2025

(30) Foreign Application Priority Data

Dec. 6, 2023 (CN) .......................... 202311674871.7

(51) Int. Cl.
G06F 3/06 (2006.01)
(52) U.S. Cl.
CPC ............ G06F 3/0659 (2013.01); G06F 3/061 (2013.01); G06F 3/0634 (2013.01); G06F 3/0679 (2013.01)
(58) Field of Classification Search
CPC ...... G06F 3/0659; G06F 3/061; G06F 3/0634; G06F 3/0679
USPC .................................................. 711/154, 100
See application file for complete search history.

(56) References Cited

U.S. PATENT DOCUMENTS

| 2009/0249001 | A1* | 10/2009 | Narayanan ............ G06F 3/0634 713/324 |
| 2018/0018091 | A1 | 1/2018 | Shin et al. |
| 2020/0012444 | A1 | 1/2020 | Ko et al. |
| 2022/0066638 | A1* | 3/2022 | Luo ......................... G06F 3/064 |
| 2022/0269440 | A1 | 8/2022 | Lin |
| 2022/0382673 | A1 | 12/2022 | Yang |
| 2024/0094923 | A1* | 3/2024 | Wakutsu ................. G06F 3/064 |

FOREIGN PATENT DOCUMENTS

TW 202340964 A 10/2023

* cited by examiner

*Primary Examiner* — Hosain T Alam
*Assistant Examiner* — Zubair Ahmed
(74) *Attorney, Agent, or Firm* — Birch, Stewart, Kolasch & Birch, LLP

(57) ABSTRACT

The invention introduces a method for configuring a current block to program data, performed by a processing unit, which includes: dividing storage space of a flash module into a static area and a dynamic area; entering a first mode to obtain a first empty SB from the dynamic area and erase the first empty SB to configure the first empty SB as a non-SLC block; and entering a second mode from the first mode to obtain a second empty SB from the static area and erase the second empty SB to configure the second empty SB as an SLC block in response that a background garbage collection (GC) flag indicates that a background GC process has been performed, at least one empty SB is presented in the static area, and a quantity of empty SBs in the dynamic area equals or is less than a predefined quantity.

20 Claims, 9 Drawing Sheets

(A)

(B)

(C)

(A)

(B)

(A)

(B)

METHOD AND NON-TRANSITORY COMPUTER-READABLE STORAGE MEDIUM AND APPARATUS FOR CONFIGURING CURRENT BLOCK TO PROGRAM DATA

CROSS-REFERENCE TO RELATED APPLICATIONS

This application claims the benefit of priority to Patent Application No. 202311674871.7, filed in China on Dec. 6, 2023; the entirety of which is incorporated herein by reference for all purposes.

BACKGROUND

The disclosure generally relates to storage devices and, more particularly, to a method, a non-transitory computer-readable storage medium and an apparatus for configuring current blocks to program data.

Flash memory devices typically include NOR flash devices and NAND flash devices. NOR flash devices are random access—a host side accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the host side has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. It is desirable to have a method, a computer-readable storage medium, and an apparatus for configuring current blocks to program data to satisfy the performance requirement of data write.

SUMMARY

In an aspect of the invention, an embodiment introduces a method for configuring current blocks to program data, performed by a processing unit, to include the following steps: dividing storage space of a flash module into a static area and a dynamic area, where each memory cell of an empty super block (SB) in the static area is only configured as a single level cell (SLC), and each memory cell of an empty SB in the dynamic area is configured as an SLC or a non-SLC; entering a first mode to obtain a first empty SB from the dynamic area and erase the first empty SB to configure the first empty SB as a non-SLC block for preparing to program first user data into the non-SLC block; in the first mode, monitoring a background garbage collection (GC) flag, a quantity of empty SBs in the static area, and a quantity of empty SBs in the dynamic area; and entering a second mode from the first mode to obtain a second empty SB from the static area and erase the second empty SB to configure the second empty SB as an SLC block for preparing to program second user data into the SLC block in response that the background GC flag indicates that a background GC process has been performed, at least one empty SB is presented in the static area, and the quantity of empty SBs in the dynamic area equals or is less than a predefined quantity, where the predefined quantity is set to any integer ranging from 2 to 5.

In another aspect of the invention, an embodiment introduces a non-transitory computer-readable storage medium having stored therein program code that, when loaded and executed by a processing unit, causes the processing unit to perform the method for configuring current blocks to program data, as described above.

In still another aspect of the invention, an embodiment introduces an apparatus for configuring current blocks to program data, to include: a flash interface (I/F), coupled to a flash module; and a processing unit, coupled to the flash I/F. The processing unit is arranged operably to: divide storage space of the flash module into a static area and a dynamic area, where each memory cell of an empty SB in the static area is only configured as an SLC, and each memory cell of an empty SB in the dynamic area is configured as an SLC or a non-SLC; enter a first mode to obtain a first empty SB from the dynamic area and erase the first empty SB to configure the first empty SB as a non-SLC block for preparing to program first user data into the non-SLC block; in the first mode, monitor a background GC flag, a quantity of empty SBs in the static area, and a quantity of empty SBs in the dynamic area; and enter a second mode from the first mode to obtain a second empty SB from the static area and erase the second empty SB to configure the second empty SB as an SLC block for preparing to program second user data into the SLC block in response that the background GC flag indicates that a background GC process has been performed, at least one empty SB is presented in the static area, and the quantity of empty SBs in the dynamic area equals or is less than a predefined quantity, where the predefined quantity is set to any integer ranging from 2 to 5.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings.

The same reference numbers may be used throughout the drawings to refer to the same or like parts, components, or operations.

Certain aspects and embodiments of this disclosure are provided below. Some of these embodiments may be applied independently and some of them may be applied in conjunction as would be apparent to those of skill in the art. In the following description, for the purposes of explanation, specific details are set forth in order to provide a thorough understanding of aspects of the application. However, it will be apparent that various embodiments may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that changes may be made in the function and arrangement of elements without departing from the spirit and scope of the application as set forth in the claims.

Figure 1:
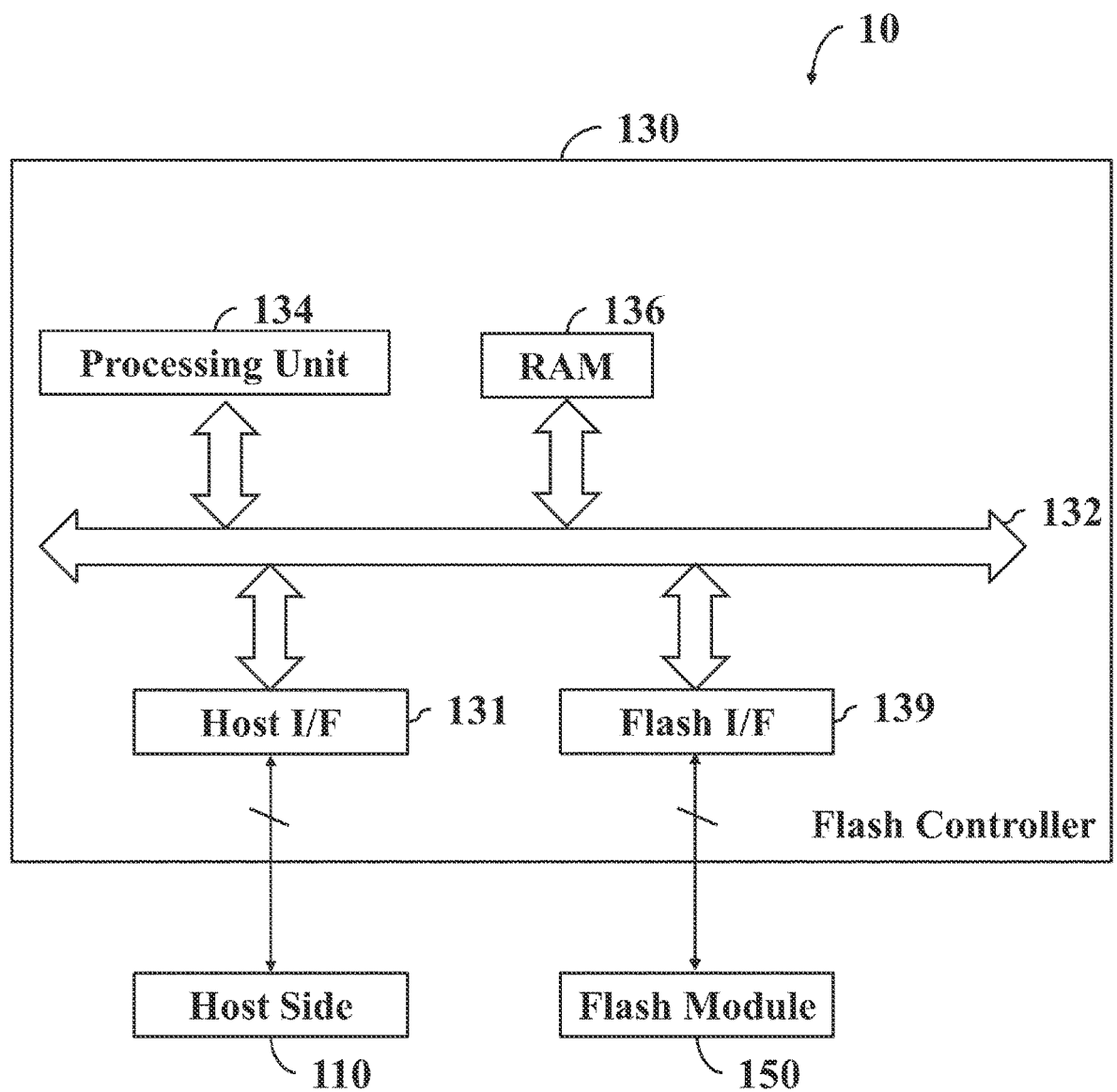
FIG. 1 is the system architecture of an electronic apparatus according to an embodiment of the invention.

Refer to FIG. 1. The electronic apparatus 10 includes the host side 110, the flash controller 130 and the flash module 150, and the flash controller 130 and the flash module 150 may be collectively referred to as a device side. The electronic apparatus 10 may be equipped with a Personal Computer (PC), a laptop PC, a tablet PC, a mobile phone, a digital camera, a digital recorder, a smart television, a smart freezer, an automotive electronics system or other consumer electronic products. The host side 110 and the host interface (I/F) 131 of the flash controller 130 may communicate with each other by Universal Serial Bus (USB), Advanced Technology Attachment (ATA), Serial Advanced Technology Attachment (SATA), Peripheral Component Interconnect Express (PCI-E), Universal Flash Storage (UFS), Embedded Multi-Media Card (eMMC) protocol, or others. The flash I/F 139 of the flash controller 130 and the flash module 150 may communicate with each other by a Double Data Rate (DDR) protocol, such as Open NAND Flash Interface (ONFI), DDR Toggle, or others. The flash controller 130 includes the processing unit 134 and the processing unit 134 may be implemented in numerous ways, such as with general-purpose hardware (e.g., a microcontroller unit, a single processor, multiple processors or graphics processing units capable of parallel computations, or others) that is programmed using firmware and/or software instructions to perform the functions recited herein. The processing unit 134 may receive host commands from the host side 110 through the host interface (I/F) 131, such as write commands, read commands, etc., schedule and execute the host commands. The flash controller 130 includes the Random Access Memory (RAM) 136, which may be implemented in a Dynamic Random Access Memory (DRAM), a Static Random Access Memory (SRAM), or the combination thereof, for allocating space as a data buffer storing user data (also referred to as host data) that has been obtained from the host side 110 and is to be programmed into the flash module 150, and that has been read from the flash module 150 and is to be output to the host side 110. The RAM 136 stores necessary data in execution, such as variables, data tables, data abstracts, host-address to flash-address mapping (H2F) tables, flash-address to host-address mapping (F2H) tables, or others. The flash I/F 139 includes a NAND flash controller (NFC) to provide functions that are required to access to the flash module 150, such as a command sequencer, a Low Density Parity Check (LDPC) encoder/decoder, etc.

The flash controller 130 may be equipped with the bus architecture 132 to couple components to each other to transmit data, addresses, control signals, etc. The components include but not limited to the host I/F 131, the processing unit 134, the RAM 136 and the flash I/F 139. A direct memory access (DMA) circuitry of a component moves data between specific components through the bus architecture 132 according to instructions or control signals. For example, a DMA circuitry of the host I/F 131 or the flash I/F 139 may migrate data in a specific data buffer thereof to a specific address of the RAM 136, migrate data in a specific address of the RAM 136 to a specific data buffer thereof, and so on.

The flash module 150 provides huge storage space typically in hundred Gigabytes (GBs), or even several Terabytes (TBs), for storing a wide range of user data, such as high-resolution images, video files, etc. The flash module 150 includes control circuitries and memory arrays containing memory cells, such as being configured as Single Level Cells (SLCs), Multi-Level Cells (MLCs), Triple Level Cells (TLCs), Quad-Level Cells (QLCs), or any combinations thereof. The processing unit 134 programs user data into a designated address (a destination address) of the flash module 150 and reads user data from a designated address (a source address) thereof through the flash I/F 139. The flash I/F 139 may use several electronic signals including a data line, a clock signal line and control signal lines for coordinating the command, address and data transfer with the flash module 150. The data line may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
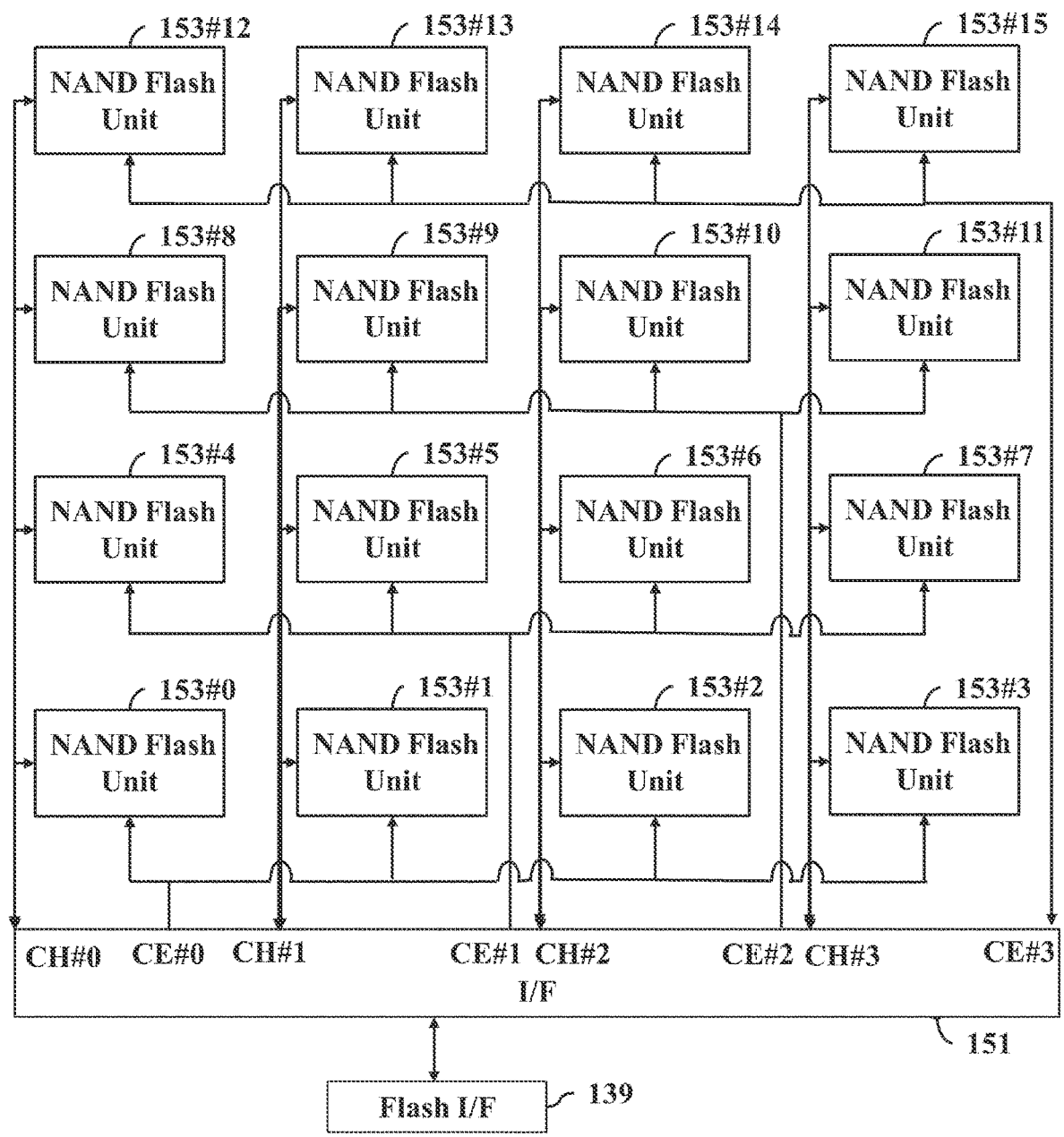
FIG. 2 is a schematic diagram illustrating a flash module according to an embodiment of the invention.

Refer to FIG. 2. The I/F 151 of the flash module 150 may include four I/O channels (hereinafter referred to as channels) CH #0 to CH #3 and each is connected to four NAND flash units, for example, the channel CH #0 is connected to the NAND flash units 150 #0, 150 #4, 150 #8 and 150 #12. Each NAND flash unit can be packaged in an independent die. The flash I/F 139 may issue one of the CE signals CE #0 to CE #3 through the I/F 151 to activate the NAND flash units 153 #0 to 153 #3, the NAND flash units 153 #4 to 153 #7, the NAND flash units 153 #8 to 153 #11, or the NAND flash units 153 #12 to 153 #15, and read data from or program data into the activated NAND flash units in parallel.

Figure 3:
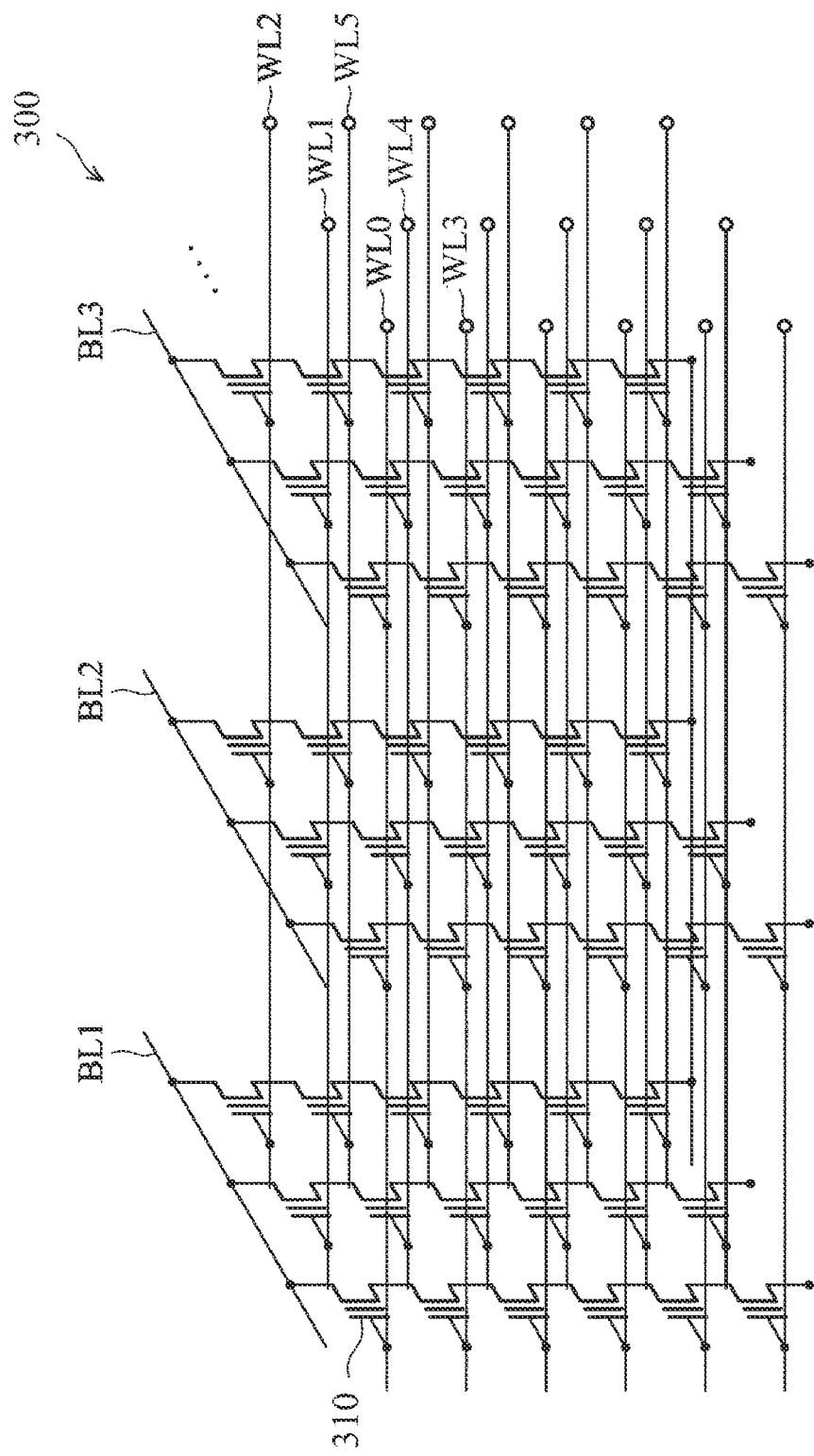
FIG. 3 is a schematic diagram showing the hardware architecture of a portion of a NAND flash unit according to an embodiment of the invention.

Refer to FIG. 3 showing the hardware architecture of a portion of a NAND flash unit. Each NAND flash unit may contain a plurality of memory blocks (e.g. the memory block 300) and the memory block 300 contains multiple memory cells, such as floating gate transistors (e.g. the floating gate transistor 310), or other charge trap devices. The structure of the memory block 300 includes bit lines and word lines. For brevity, only the bit lines BL1 to BL3 and the word lines WL0 to WL5 are labeled in FIG. 3. For example, the floating gate transistors on the word lines WL0 to WL2 and WL3 to WL5 form two pages for storing data of two pages, respectively.

Each NAND flash unit may include multiple data planes, each data plane may include multiple physical blocks. In order to improve the data programming and data reading efficiency, designated physical blocks of the data planes in multiple NAND flash units are organized into one super block (SB), so that each SB contains multiple physical pages. The SB and the physical page are identified by a super-block number and a page number, respectively, and the combination is referred to as a physical address of the flash module 150.

Each SB is labeled as a data block, a current block or a system block according to its function. The processing unit 134 may select an empty SB as the current block for preparing to program user data received from the host side 110, or management information of the flash module 150. The management information may include the flash identifier (ID), the bad block table, the bad column table, the H2F tables, and so on. In order to improve the efficiency of data programming, the user data provided by the host side 110 or the management information of the flash module 150 is programmed in parallel into designated physical blocks of the SB across multiple NAND flash units. The processing unit 134 maintains the F2H table for each current block. Each F2H table contains multiple records. Each record stores the information indicating which logical address of user data that is associated with (or mapped by) a designated physical page in the current block. The records in the F2H table are stored in the order of the page numbers of physical pages in the current block. The logical address may be expressed in a logical block address (LBA), a host page number or other expression and is managed by the host side 110. For example, each LBA or host page is associated with the user data or the management information in 4K bytes. In some embodiments, the processing unit 134 may drive the flash I/F 139 to program the corresponding F2H table in the RAM 136 into the data region of the designated physical page (for example, the last physical page) of one current block after all physical pages of this current block are fully stored in user data or the remaining physical pages of this current block are filled with dummy values. The current block is changed to the data block after the corresponding F2H table has been programmed into the flash module 150, and the user data stored in the data block cannot be modified. In alternative embodiments, the processing unit 134 may drive the flash I/F 139 to program the corresponding F2H table in the RAM 136 into the data region of the designated physical page (for example, the last physical page) of one current block after all physical pages of this current block are fully stored in management information or the remaining physical pages of this current block are filled with dummy values. The current block is changed to the system block after the corresponding F2H table has been programmed into the flash module 150, and the system information stored in the data block cannot be modified. Each of the data blocks and the system blocks may be referred to as a closed clock.

In order to store the user data provided by the host side, the storage space of the flash module 150 is divided into a static area and a dynamic area. It is to be understood that the static area and the dynamic area do not used to store the management information. Memory cells of empty SBs in the static area can only be configured as SLCs to program user data. Memory cells of empty SBs in the dynamic area are principally configured as MLCs, TLCs or QLCs (collectively referred to as non-SLCs) to program user data, but under certain conditions, a portion of memory cells of empty SBs in the dynamic area are allowed to be configured as SLCs to program user data. For example, the SBs SB #0 to SB #7167 form the static area in the flash module 150 and the SBs SB #7168 to SB #39935 form the dynamic area in the flash module 150. When each memory cell of one SB (so-called SLC block) is SLC capable of recording two states, each physical word line stores user data of single pages. When each memory cell of one SB (so-called MLC block) is MLC capable of recording four states, each physical word line stores user data of dual-pages, including Most Significant Bit (MSB) pages and Least Significant Bit (LSB) pages. When each memory cell of one SB (so-called TLC block) is TLC capable of recording eight states, each physical word line stores user data of triple-pages, including MSB pages, Center Significant Bit (CSB) pages and LSB pages. When each memory cell of one SB (so-called QLC block) is QLC capable of recording sixteen states, each physical word line stores user data of quad-pages, including Top Significant Bit (TSB) pages, MSB pages, CSB pages and LSB pages.

Since the user data of the same logical address may be programmed into different physical pages in the current block at different time points, some physical pages containing invalid data (i.e. the earlier programmed data) may appear in the current block and thus, the processing unit 134 calculates a valid page count (VPC) of the current block. The processing unit 134 maintains a VPC table in the RAM 136, which includes multiple records for storing VPCs of all SBs. Initially, all records of the VPC table store "0" to indicate that the VPCs of all SBs are zeros. Each time one data block is generated, the processing unit 134 updates the VPC table to store the VPC of this data block. Assume a one-to-one correspondence between logical addresses and physical pages: The processing unit 134 updates the VPC table to subtract one from the VPC of a designated data block when new user data of a logical address is programmed into the current block that makes the user data of the same logical address stored in the designated data block becomes invalid. The processing unit 134 updates the VPC table to subtract one from the VPC of a designated data block when a trim command issued by the host side 110 is executed to trim user data of a logical address that is stored in the designated data block. Any record storing "0" appeared in the VPC table indicates that the data block corresponding to this record hasn't stored any valid data and can be recycled as an empty SB.

To optimize the programing efficiency of user data and management information, an embodiment of the invention introduces three pop modes for data programming: static SLC (SSLC); dynamic SLC (DSLC); and non-SLC direct write (NDW). The processing unit 134 determines which pop mode is entered in terms of the quantity of empty SBs of the static and dynamic areas in the flash module 150, and/or the quantity of used SBs of the static and dynamic areas in the flash module 150.

Figure 4:
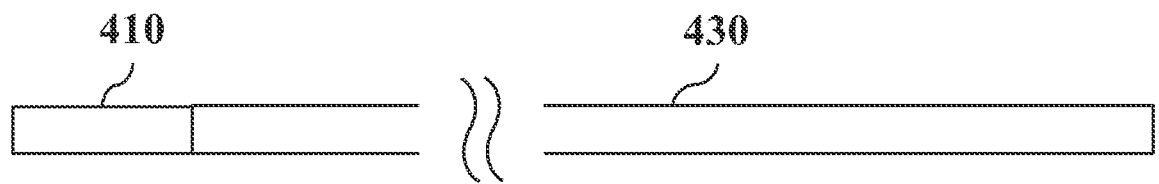
FIG. 4 is a schematic diagram showing the usage of super blocks (SBs) in a static area and a dynamic area of the flash module in specific situations according to an embodiment of the invention.
Figure 4:
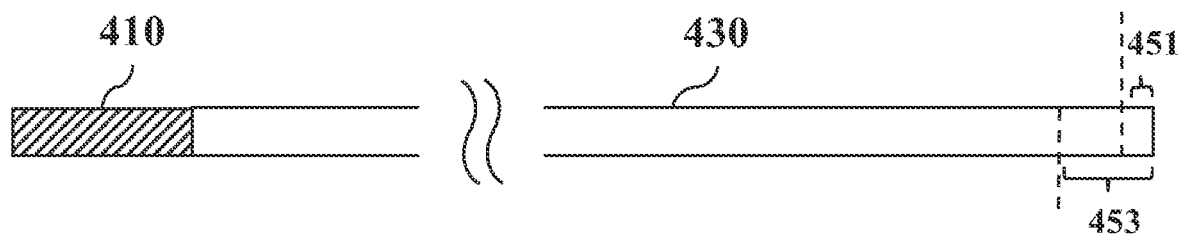
Figure 4:
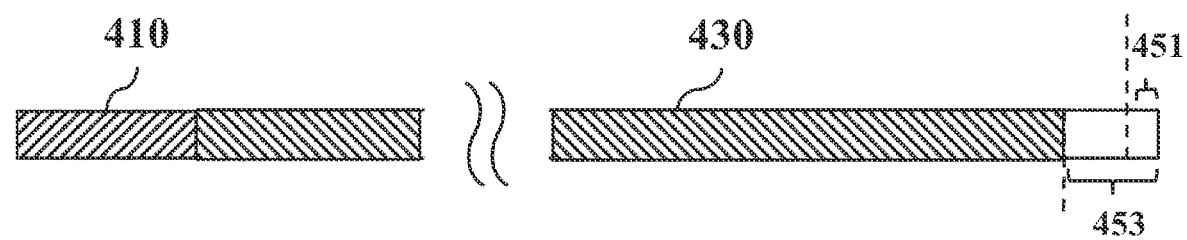

For example, in the initial state of the flash module 150 (as shown in part (A) of FIG. 4), no data has been programmed into the static area 410 and the dynamic area 430 of the flash module 150, the processing unit 134 enters the SSLC mode. The processing unit 134 stays in the SSLC mode until all SBs of the static area 410 have been filled with user data. Refer to part (B) of FIG. 4, the static area 410 is filled with slashes, indicating that the data has been filled. In the SSLC mode, the processing unit 134 obtains one empty SB from the static area 410 at a time, and erases the empty SB to configure it as an SLC block for preparing to program user data into the SLC block.

The processing unit 134 enters the DSLC mode when all SBs of the static area 410 in the flash module 150 have been fully programmed (as shown in part (B) of FIG. 4). The processing unit 134 stays in the DSLC mode until the quantity of empty SBs in the dynamic area 430 is equal to or less than an NDW threshold, or a condition for exiting the DSLC mode is met. For example, the processing unit 134 may set the quantity of spare SBs 451 to any integer ranging from 8 to 20, and set the NDW threshold to the triple of the quantity of spare SBs (as indicated by the notation 453). In the DSLC mode, the processing unit 134 obtains one empty SB from the dynamic area 430 at a time, and erases the empty SB to configure it as an SLC block for preparing to program user data into the SLC block.

The processing unit 134 enters the NDW mode when the quantity of the empty SBs of the dynamic area 430 in the flash module 150 is equal to or less than the NDW threshold. The processing unit 134 stays in the NDW mode until the flash module 150 has been filled with data, or a condition for exiting the NDW mode is met. Refer to part (C) of FIG. 4, the portion of the dynamic area 430 filling with backslashes represents the SBs that have been filled with data. In the NDW mode, the processing unit 134 obtains one empty SB from the dynamic area 430 at a time, and erases the empty SB to configure it as a non-SLC block for preparing to program user data into the non-SLC block. The non-SLC block may be a MLC, TLC or QLC block.

Since the unstable of the data programming speed would cause in a poor user experience, the processing unit 134 usually does not allow to jump back to the SSLC mode from the NDW mode. Specifically, about the programming speed, the modes in the order from fast to slow are SSLC mode, DSLC mode and the NDW mode. After the SSLC mode is entered from the NDW mode, the data programming speed would go up to the fastest level from the slowest level. However, after the SBs of the static area 410 are filled with data, the NDW mode is entered from the SSLC mode, causing the data programming speed to drop to the slowest level from the fastest level. Sudden changes in data programming speed would make users suspect that the manufacturing quality of the device side is poor.

Although the SSLC mode is entered from the NDW mode would cause a sudden change in data programming speed, the present invention introduces an embodiment of a method for programming data to better use the storage space in the flash module 150, which allows the processing unit 134 to enter the SSLC mode from the NDW mode when a specific condition is met.

Figure 5:
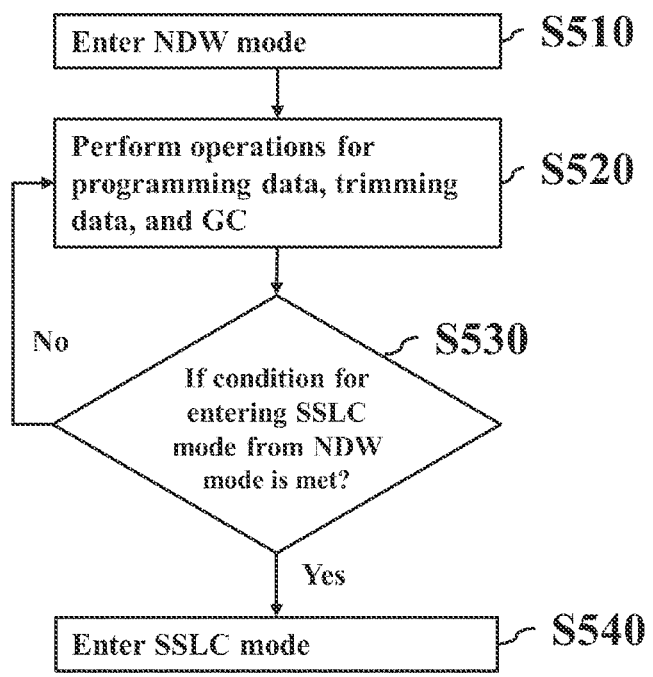
FIG. 5 is a flowchart illustrating a method for programming data according to an embodiment of the invention.

Refer to FIG. 5 illustrating a method for programming data, performed by the processing unit 134 when loading and executing program code of the firmware translation layer (FTL) to enter the SSLC mode from the NDW mode. Details are described as follows:

Step S510: The NDW mode is entered. For the conditions for entering the NDW mode, please refer to the description in the above paragraphs, and will not be repeated for brevity.

Step S520: The operations for programming data, trimming data, and the garbage collection (GC) are performed. In the NDW mode, the FTL may drive the flash I/F 139 to program user data of multiple pages instructed by the host side 110 into the current block in the dynamic area 430 of the flash module 150. The FTL may update the VPC table to respond to the execution results of the trim commands. The FTL may perform the background GC process in an idle period for the host I/F 131. There is no interaction between the host side 110 and the flash controller 130 for host command and user data in the idle period for the host I/F 131. The FTL may insert foreground GC process into the host-data programming operations in the interleaved manner. Details for programming data in the NDW mode, please refer to the description in the above paragraphs, and will not be repeated for brevity.

Step S530: It is determined whether a condition for entering the SSLC mode from the NDW mode is met. If so, the process proceeds to step S540. Otherwise, the process proceeds step S520.

Figure 6:
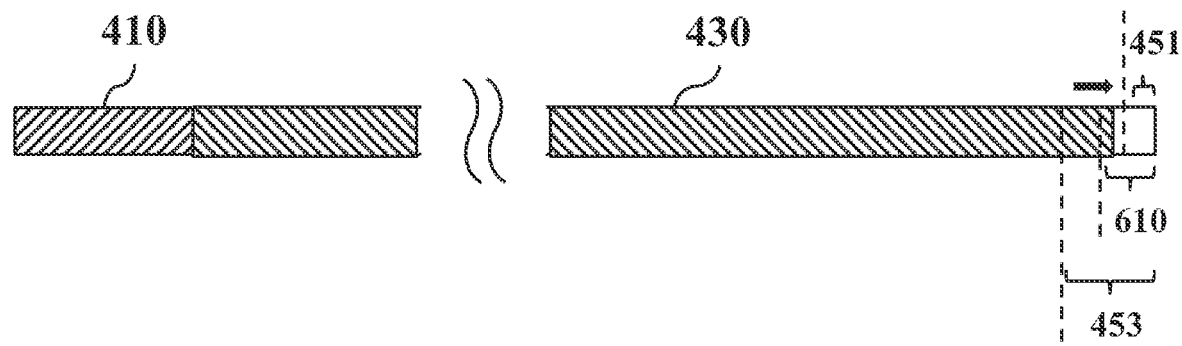
FIGS. 6 and 7 are schematic diagrams showing the usage of SBs in the static area and the dynamic area of the flash module in specific situations according to an embodiment of the invention.
Figure 6:
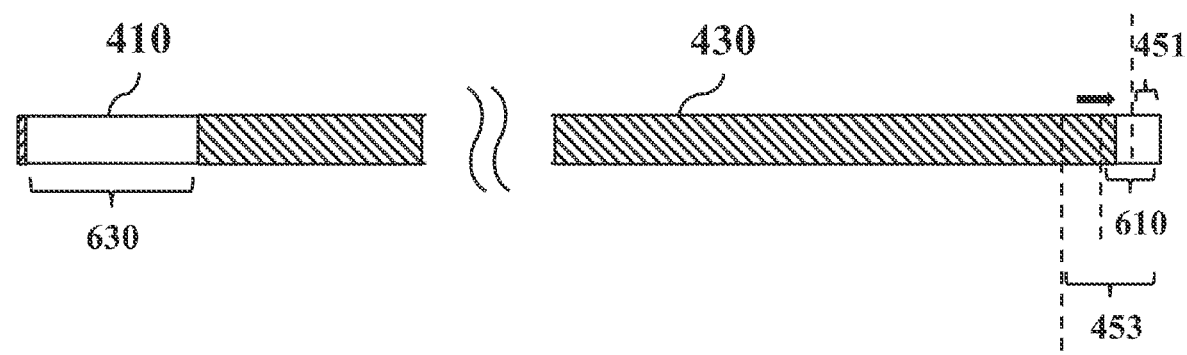

Refer to part (A) of FIG. 6. The FTL may set an SLC-block To Non-SLC-block (S2N) GC threshold to the double of the quantity of spare SBs (as indicated by the notation 610). The S2N GC process is activated when the quality of the empty SBs in the dynamic area 430 is equal to or less than the S2N GC threshold. In the S2N GC process performed in foreground or background, the FTL collects valid user data from multiple SLC data-block candidates in the static area 410 and/or the dynamic area 430, and then, programs the collected valid user data into the non-SLC current block in the dynamic area 430. In some embodiments, for step S520, the FTL may drive the flash I/F 139 to program the collected valid user data into the MLC current block, thereby enabling the SLC data-block candidates after being became empty SBs in the static area 410 and/or the dynamic area 430 to be recycled. In alternative embodiments, for step S520, the FTL may drive the flash I/F 139 to program the collected valid user data into the TLC current block, thereby enabling the SLC data-block candidates after being became empty SBs in the static area 410 and/or the dynamic area 430 to be recycled. In alternative embodiments, for step S520, the FTL may drive the flash I/F 139 to program the collected valid user data into the QLC current block, thereby enabling the SLC data-block candidates after being became empty SBs in the static area 410 and/or the dynamic area 430 to be recycled. Refer to part (B) of FIG. 6. The FTL periodically monitors the quantity of empty SBs in the static area 410. The FTL determines that the condition for entering the SSLC mode from the NDW mode is met when the quantity of empty SBs in the static area 410 equals or exceeds the predefined ratio of the total number of SBs in the static area 410 (for example, any ratio ranging from 90% to 100%, as indicated by the notation 630).

Figure 7:
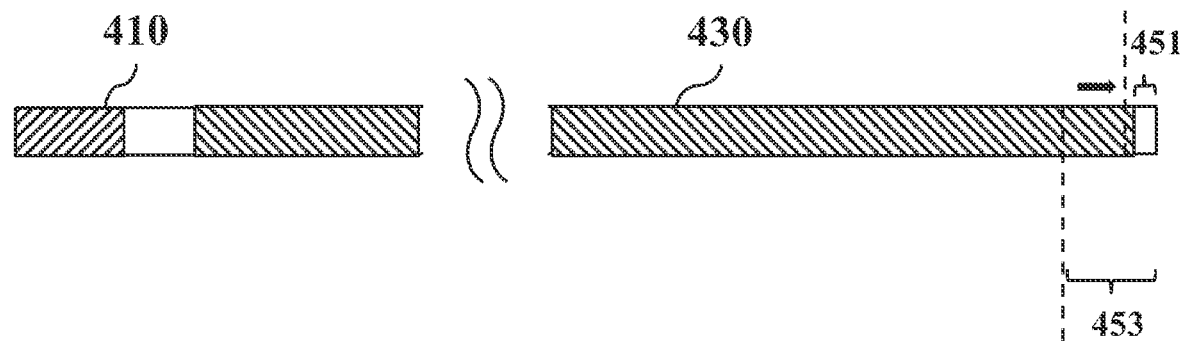
Figure 7:
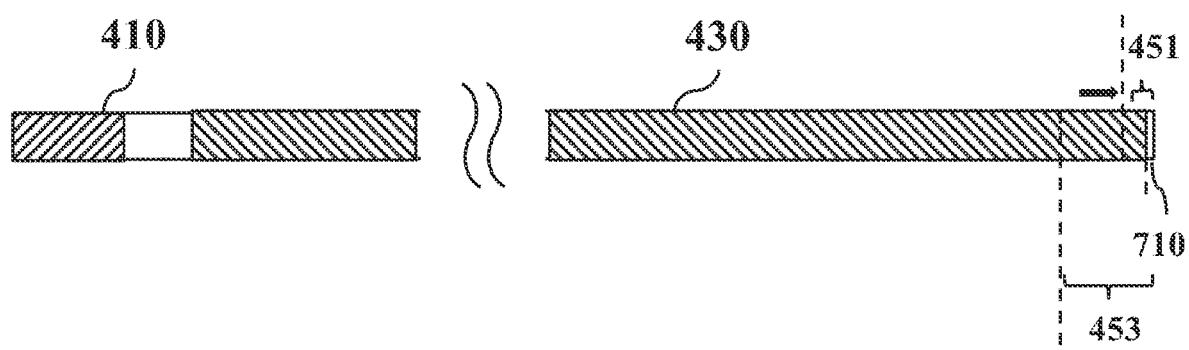

Refer to part (A) of FIG. 7. The FTL may set a Non-SLC-block To Non-SLC-block (N2N) GC threshold to the quantity of spare SBs 451. The N2N GC process is activated when the quality of the empty SBs in the dynamic area 430 is equal to or less than the N2N GC threshold. In the N2N GC process performed in foreground or background, the FTL collects valid user data from multiple non-SLC data-block candidates in the dynamic area 430, and then, programs the collected valid user data into the non-SLC current block in the dynamic area 430. In some embodiments, for step S520, the FTL may drive the flash I/F 139 to program the collected valid user data into the MLC current block, thereby enabling the MLC data-block candidates after being became empty SBs in the dynamic area 430 to be recycled. In alternative embodiments, for step S520, the FTL may drive the flash I/F 139 to program the collected valid user data into the TLC current block, thereby enabling the TLC data-block candidates after being became empty SBs in the dynamic area 430 to be recycled. In alternative embodiments, for step S520, the FTL may drive the flash I/F 139 to program the collected valid user data into the QLC current block, thereby enabling the QLC data-block candidates after being became empty SBs in the dynamic area 430 to be recycled. Refer to part (B) of FIG. 7. The FTL periodically monitors the background GC flag, the quantity of empty SBs in the static area 410, and the quantity of empty SBs in the dynamic area 430. The FTL determines that the condition for entering the SSLC mode from the NDW mode is met when the background GC flag indicates that the background S2N/N2N GC process (collectively referred to as background GC process) has been performed, at least one empty SB is presented in the static area 410, and the quantity of empty SBs in the dynamic area 430 equals or is less than the predefined quantity 710 (for example, one quarter of the quantity of spare SBs 451, or any integer ranging from 2 to 5).

Step S540: The SSLC mode is entered. Derails for programming data in the SSLC mode, please refer to the description in the above paragraphs, and will not be repeated for brevity.

Typically, the NDW mode is entered from the DSLC mode when the quantity of empty SBs in the dynamic area 430 is equal to or less than the NDW threshold. But, in order to avoid wasting the available space in the static area 410, an embodiment of the invention introduces a method for programming data, which allows the processing unit 134 to first go back to the SSLC mode from the DSLC mode when a specific condition is met.

Figure 8:
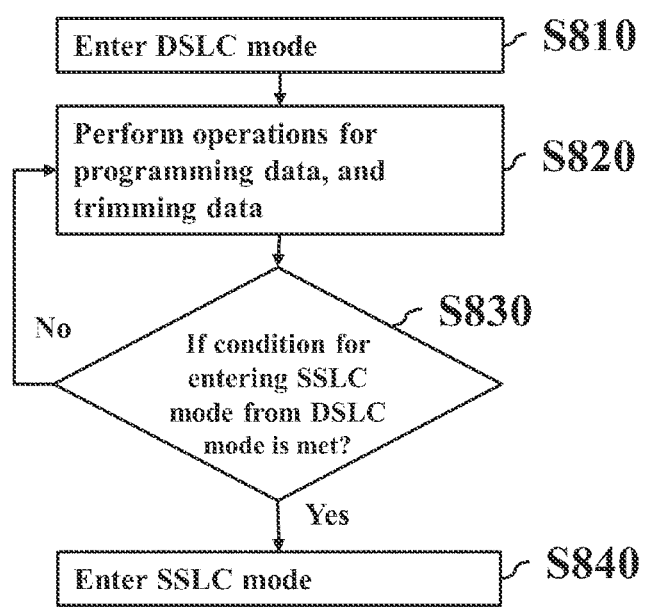
FIG. 8 is a flowchart illustrating a method for programming data according to an embodiment of the invention.

Refer to FIG. 8 illustrating a method for programming data, performed by the processing unit 134 when loading and executing program code of the FTL to enter the SSLC mode from the DSLC mode. Details are described as follows:

Step S810: The DSLC mode is entered. For the conditions for entering the SSLC mode, please refer to the description in the above paragraphs, and will not be repeated for brevity.

Step S820: The operations for programming data, and trimming data are performed. In the DSLC mode, the FTL may drive the flash I/F 139 to program user data of multiple pages instructed by the host side 110 into the current block in the dynamic area 430 of the flash module 150. The FTL may update the VPC table to respond to the execution results of the trim commands. Details for programming data in the DSLC mode, please refer to the description in the above paragraphs, and will not be repeated for brevity.

Step S830: It is determined whether a condition for entering the SSLC mode from the DSLC mode is met. If so, the process proceeds to step S840. Otherwise, the process proceeds step S820.

Figure 9:
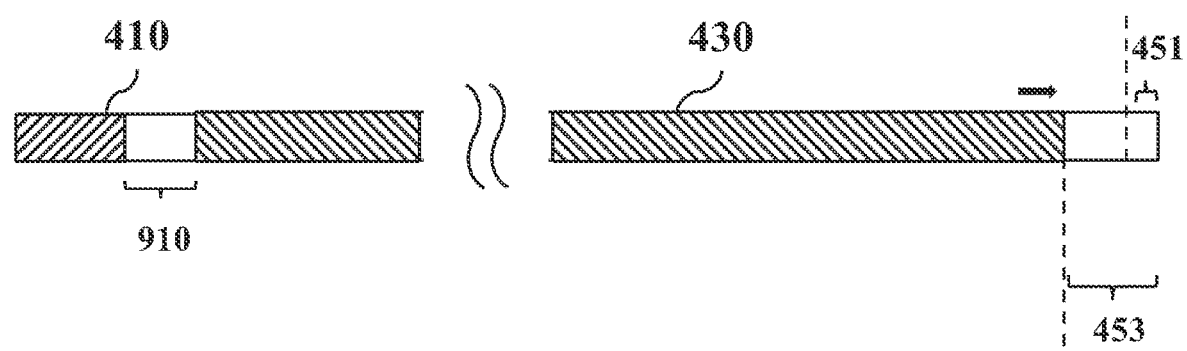
FIG. 9 is a schematic diagram showing the usage of SBs in the static area and the dynamic area of the flash module in a specific situation according to an embodiment of the invention.

Refer to FIG. 9. When the FTL detects that the quantity of empty SBs in the dynamic area 430 is equal to or less than the NDW threshold and may need to enter the NDW mode, it first checks whether the condition for entering the SSLC mode from the DSLC mode is met. The FTL may search the content of VPC table to determine whether the quantity of empty SBs in the static area 410 exceeds the empty-SB threshold 910, which may be set to a predefined ratio of the total number of SBs in the static area 410 (for example, any ratio ranging from 30% to 70%). The FTL determines that the condition for entering the SSLC mode from the DSLC mode is met when the quantity of empty SBs in the static area 410 exceeds the empty-SB threshold 910.

Step S840: The SSLC mode is entered. Derails for programming data in the SSLC mode, please refer to the description in the above paragraphs, and will not be repeated for brevity.

Although the invention is illustrated and described herein with reference to specific embodiments, the invention is not intended to be limited to the details shown. Rather, various modifications may be made in the details within the scope and range of equivalents of the claims and without departing from the invention. It is to be understood that the above description is illustrative of the invention and is not to be construed as limiting the invention. Various modifications, applications and/or combinations of the embodiments may occur to those skilled in the art without departing from the scope of the invention as defined by the claims.

One having ordinary skill in the art will readily understand that the invention as discussed above may be practiced with hardware elements in configurations which are different than those which are disclosed. Therefore, although the invention has been described based upon these preferred embodiments, it would be apparent to those skilled in the art that certain modifications, variations, and alternative constructions would be apparent, while remaining within the scope of the invention.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

The term "device" or "module" is not limited to one or a specific number of physical objects (such as one smartphone, one controller, one processing system and so on). As used herein, a device may be any electronic device with one or more parts that may implement at least some portions of the invention in this disclosure. While the description and examples use the term "device" or "module" to describe various aspects of this disclosure, the term "device" or "module" is not limited to a specific configuration, type, or number of objects. Additionally, the term "system" or "module" is not limited to multiple components or specific aspects. For example, a system may be implemented on one or more printed circuit boards or other substrates and may have movable or static components. While the description and examples use the term "system" to describe various aspects of the invention in this disclosure, the term "system" is not limited to a specific configuration, type, or number of objects.

Specific details are provided in the description above to provide a thorough understanding of the aspects and examples provided herein. However, it will be understood by one of ordinary skills in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, wellknown circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Some or all of the aforementioned embodiments of the method of the invention may be implemented in a computer program such as a driver for a dedicated hardware, a Firmware Translation Layer (FTL) of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier, or may be located in a network server accessible via a network such as the Internet, or any other suitable carrier.

A computer-readable storage medium includes volatile and non-volatile, removable and non-removable media implemented in any method or technology for storage of information such as computer-readable instruction, data structures, program modules, or other data. A computer-readable storage medium includes, but is not limited to, RAM, ROM, EEPROM, flash memory or other memory, CD-ROM, digital versatile disks (DVD), Blue-ray disk or other optical storage, magnetic cassettes, magnetic tape, magnetic disk or other magnetic storage devices, or any other medium which can be used to store the desired information and may be accessed by an instruction execution system. Note that a computer-readable medium can be paper or other suitable medium upon which the program is printed, as the program can be electronically captured via, for instance, optical scanning of the paper or other suitable medium, then compiled, interpreted, or otherwise processed in a suitable manner, if necessary, and then stored in a computer memory.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

Although the embodiment has been described as having specific elements in FIGS. 1-3, it should be noted that additional elements may be included to achieve better performance without departing from the spirit of the invention. Each element of FIGS. 1-3 is composed of various circuitries and arranged to operably perform the aforementioned operations. While the process flows described in FIGS. 5 and 8 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for configuring a current block to program data, performed by a processing unit, comprising:
    dividing storage space of a flash module into a static area and a dynamic area, wherein each memory cell of an empty super block (SB) in the static area is only configured as a single level cell (SLC), and each memory cell of an empty SB in the dynamic area is configured as an SLC or a non-SLC;
    entering a first mode to obtain a first empty SB from the dynamic area and erase the first empty SB to configure the first empty SB as a non-SLC block for preparing to program first user data into the non-SLC block;
    in the first mode, monitoring a background garbage collection (GC) flag, a quantity of empty SBs in the static area, and a quantity of empty SBs in the dynamic area; and
    entering a second mode from the first mode to obtain a second empty SB from the static area and erase the second empty SB to configure the second empty SB as an SLC block for preparing to program second user data into the SLC block in response that the background GC flag indicates that a background GC process has been performed, at least one empty SB is presented in the static area, and the quantity of empty SBs in the dynamic area equals or is less than a predefined quantity, wherein the predefined quantity is set to any integer ranging from 2 to 5.

2. The method of claim 1, wherein the non-SLC is a multi-level cell (MLC), triple level cell (TLC), or a quad-level cell (QLC).

3. The method of claim 1, wherein the background GC process is performed in an idle period for a host interface (I/F) to collect valid user data from a plurality of SLC data-block candidates in the static area and/or the dynamic area, and program the valid user data into a non-SLC current block in the dynamic area, thereby enabling the SLC data-block candidates after being became empty SBs in the static area and/or the dynamic area to be recycled.

4. The method of claim 1, wherein the background GC process is performed in an idle period for a host interface (I/F) to collect valid user data from a plurality of non-SLC data-block candidates in the dynamic area, and program the valid user data into a non-SLC current block in the dynamic area, thereby enabling the non-SLC data-block candidates after being became empty SBs in the dynamic area to be recycled.

5. The method of claim 1, comprising:
entering the second mode from the first mode to obtain the second empty SB from the static area and erase the second empty SB to configure the second empty SB as the SLC block for preparing to program the second user data into the SLC block in response that the quantity of empty SBs in the static area equals or exceeds a predefined ratio of a total number of SBs in the static area.

6. The method of claim 5, wherein the predefined ratio is set to any ratio ranging from 90% to 100%.

7. The method of claim 1, wherein the first mode is entered in response that the quantity of empty SBs in the dynamic area is equal to or less than a threshold, wherein the threshold is set to a triple of a quantity of spare SBs, and the quantity of spare SBs is set to any integer ranging from 8 to 20.

8. A non-transitory computer-readable storage medium having stored therein program code that, when loaded and executed by a processing unit, causes the processing unit to:
divide storage space of a flash module into a static area and a dynamic area, wherein each memory cell of an empty super block (SB) in the static area is only configured as a single level cell (SLC), and each memory cell of an empty SB in the dynamic area is configured as an SLC or a non-SLC;
enter a first mode to obtain a first empty SB from the dynamic area and erase the first empty SB to configure the first empty SB as a non-SLC block for preparing to program first user data into the non-SLC block;
in the first mode, monitor a background garbage collection (GC) flag, a quantity of empty SBs in the static area, and a quantity of empty SBs in the dynamic area; and
enter a second mode from the first mode to obtain a second empty SB from the static area and erase the second empty SB to configure the second empty SB as an SLC block for preparing to program second user data into the SLC block in response that the background GC flag indicates that a background GC process has been performed, at least one empty SB is presented in the static area, and the quantity of empty SBs in the dynamic area equals or is less than a predefined quantity, wherein the predefined quantity is set to any integer ranging from 2 to 5.

9. The non-transitory computer-readable storage medium of claim 8, wherein the non-SLC is a multi-level cell (MLC), triple level cell (TLC), or a quad-level cell (QLC).

10. The non-transitory computer-readable storage medium of claim 8, wherein the background GC process is performed in an idle period for a host interface (I/F) to collect valid user data from a plurality of SLC data-block candidates in the static area and/or the dynamic area, and program the valid user data into a non-SLC current block in the dynamic area, thereby enabling the SLC data-block candidates after being became empty SBs in the static area and/or the dynamic area to be recycled.

11. The non-transitory computer-readable storage medium of claim 8, wherein the background GC process is performed in an idle period for a host interface (I/F) to collect valid user data from a plurality of non-SLC data-block candidates in the dynamic area, and program the valid user data into a non-SLC current block in the dynamic area, thereby enabling the non-SLC data-block candidates after being became empty SBs in the dynamic area to be recycled.

12. The non-transitory computer-readable storage medium of claim 8, wherein the program code that, when loaded and executed by the processing unit, causes the processing unit to:
enter the second mode from the first mode to obtain the second empty SB from the static area and erase the second empty SB to configure the second empty SB as the SLC block for preparing to program the second user data into the SLC block in response that the quantity of empty SBs in the static area equals or exceeds a predefined ratio of a total number of SBs in the static area, wherein the predefined ratio is set to any ratio ranging from 90% to 100%.

13. The non-transitory computer-readable storage medium of claim 8, wherein the first mode is entered in response that the quantity of empty SBs in the dynamic area is equal to or less than a threshold, wherein the threshold is set to a triple of a quantity of spare SBs, and the quantity of spare SBs is set to any integer ranging from 8 to 20.

14. An apparatus for configuring a current block to program data, comprising:
a flash interface (I/F), coupled to a flash module; and
a processing unit, coupled to the flash I/F, arranged operably to: divide storage space of the flash module into a static area and a dynamic area, wherein each memory cell of an empty super block (SB) in the static area is only configured as a single level cell (SLC), and each memory cell of an empty SB in the dynamic area is configured as an SLC or a non-SLC; enter a first mode to obtain a first empty SB from the dynamic area and erase the first empty SB to configure the first empty SB as a non-SLC block for preparing to program first user data into the non-SLC block; in the first mode, monitor a background garbage collection (GC) flag, a quantity of empty SBs in the static area, and a quantity of empty SBs in the dynamic area, and enter a second mode from the first mode to obtain a second empty SB from the static area and erase the second empty SB to configure the second empty SB as an SLC block for preparing to program second user data into the SLC block in response that the background GC flag indicates that a background GC process has been performed, at least one empty SB is presented in the static area, and the quantity of empty SBs in the dynamic area equals or is less than a predefined quantity, wherein the predefined quantity is set to any integer ranging from 2 to 5.

15. The apparatus of claim 14, wherein the non-SLC is a multi-level cell (MLC), triple level cell (TLC), or a quad-level cell (QLC).

16. The apparatus of claim 14, wherein the background GC process is performed in an idle period for a host interface (I/F) to collect valid user data from a plurality of SLC data-block candidates in the static area and/or the dynamic area, and program the valid user data into a non-SLC current block in the dynamic area, thereby enabling the SLC data-block candidates after being became empty SBs in the static area and/or the dynamic area to be recycled.

17. The apparatus of claim 14, wherein the background GC process is performed in an idle period for a host interface (I/F) to collect valid user data from a plurality of non-SLC data-block candidates in the dynamic area, and program the valid user data into a non-SLC current block in the dynamic area, thereby enabling the non-SLC data-block candidates after being became empty SBs in the dynamic area to be recycled.

18. The apparatus of claim 14, wherein the processing unit is arranged operably to: enter the second mode from the first mode to obtain the second empty SB from the static area and erase the second empty SB to configure the second empty SB as the SLC block for preparing to program the second user data into the SLC block in response that the quantity of empty SBs in the static area equals or exceeds a predefined ratio of a total number of SBs in the static area.

19. The apparatus of claim 18, wherein the predefined ratio is set to any ratio ranging from 90% to 100%.

20. The apparatus of claim 14, wherein the processing unit is arranged operably to: enter the first mode in response that the quantity of empty SBs in the dynamic area is equal to or less than a threshold, wherein the threshold is set to a triple of a quantity of spare SBs, and the quantity of spare SBs is set to any integer ranging from 8 to 20.

* * * * *